(12) United States Patent
Hemphill

(10) Patent No.: US 10,951,081 B2
(45) Date of Patent: Mar. 16, 2021

(54) BOBBIN FOR CONTAINING ELECTRIC WINDINGS

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 409 days.

(21) Appl. No.: 16/048,855

(22) Filed: Jul. 30, 2018

(65) Prior Publication Data

US 2020/0036253 A1 Jan. 30, 2020

(51) Int. Cl.
*H02K 3/34* (2006.01)
*H02K 3/32* (2006.01)
*H02K 3/18* (2006.01)
*H02K 1/14* (2006.01)

(52) U.S. Cl.
CPC .............. *H02K 3/325* (2013.01); *H02K 1/14* (2013.01); *H02K 3/18* (2013.01); *H02K 2203/12* (2013.01)

(58) Field of Classification Search
CPC ...... H02K 2203/12; H02K 3/522; H02K 3/18; H02K 3/47; H02K 3/12; H02K 1/14; H02K 3/32; H02K 3/04
USPC ................ 310/214–215, 208, 194
See application file for complete search history.

(56) References Cited

U.S. PATENT DOCUMENTS

| | | | | |
|---|---|---|---|---|
| 7,629,721 B2* | 12/2009 | Yukitake | ............... | H02K 1/08 310/194 |
| 2005/0017593 A1 | 1/2005 | Suzuki | | |
| 2009/0079288 A1 | 3/2009 | Huang et al. | | |
| 2012/0286619 A1* | 11/2012 | Tsuiki | ............... | H02K 3/522 310/215 |
| 2013/0221770 A1* | 8/2013 | Yokogawa | ............ | H02K 1/148 310/43 |
| 2014/0035428 A1* | 2/2014 | Yuya | ............... | H02K 3/522 310/215 |
| 2014/0363320 A1 | 12/2014 | Hayakawa et al. | | |
| 2016/0380521 A1* | 12/2016 | Tsuchiya | ............... | H02K 1/165 310/215 |

* cited by examiner

*Primary Examiner* — Thanh Lam
(74) *Attorney, Agent, or Firm* — Volpe Koenig

(57) ABSTRACT

A bobbin is provided for a stator of an electromagnetic device. The bobbin has two spaced-apart walls around which copper windings are wound. The spaced-apart wall arrangement reduces the material and space occupied by the bobbin, allowing for additional copper windings.

16 Claims, 2 Drawing Sheets

US 10,951,081 B2

BOBBIN FOR CONTAINING ELECTRIC WINDINGS

FIELD OF INVENTION

The present invention relates to an electromagnetic device, and more particularly to a bobbin for a stator with a simplified structure minimizing space and improving performance of a pump/motor.

BACKGROUND

Bobbins are known in a variety of applications for supporting copper windings while at the same time containing the windings to prevent contact between the windings and a metallic stator of an electromagnetic device. The stator may have a plurality of stator poles each with a copper winding. The copper windings provide magnetic flux during operation of the electromagnetic device. Such an electromagnetic device may include a motor, solenoid, pump, or an eccentric pump motor. Bobbins also expedite manufacturing processes by allowing separate steps of winding the copper onto the bobbin and then installing the bobbin with winding onto the stator.

Contact between the windings and the stator can damage insulation on the wire and eventually short out the electrical circuit. Operation of the electromagnetic device and devices powered thereby can result in vibration and wear. Vibration and wear can affect the integrity of the electromagnetic device, including the bobbin. Additional copper wire in the windings can improve performance, especially power density, of the electromagnetic device.

SUMMARY

Briefly stated, a component for a circular stator is provided. The component includes a bobbin and a winding envelope. The bobbin has a first radial end section, a second radial end section, a first wall, and a second wall. The second radial end section is spaced apart from the first radial end section in a radial direction. The first wall and the second wall extend radially between the first and second radial end sections. The first wall defines a width. The first wall and the second wall are separated in one of an axial direction and a circumferential direction. The bobbin defines a winding envelope for a coil wrapped around the bobbin. The coil passes from the first wall to the second wall without any portion of the bobbin therebetween.

In another aspect, a stator is provided for an electromagnetic device, the stator including a stator pole, a bobbin, and a winding of conductive coil. The stator pole extends radially. The bobbin has a first radial end section, a second radial end section, a first wall, and a second wall. The second radial end section is spaced apart from the first radial end section in a radial direction. The first wall and the second wall extend radially between the first and second radial end sections. The first and second walls each have a thickness in the axial direction. The winding of conductive coil is wrapped around the bobbin. A portion of the winding is spaced from the stator pole by a clearance distance.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
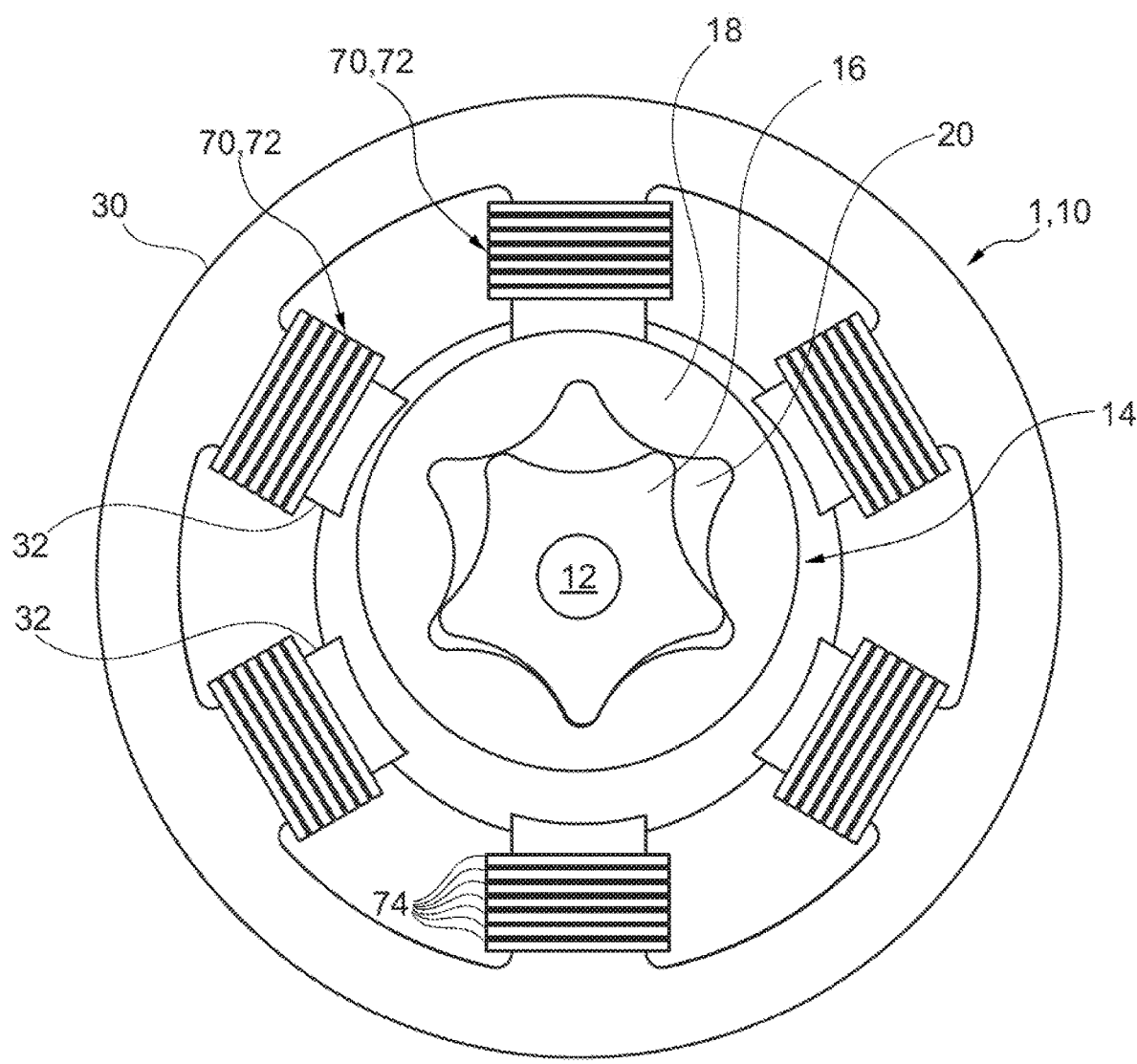
FIG. 1 is a top plan view of an electromagnetic device in accordance with an embodiment of the present application.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described. "About" as used herein when referring to a measurable value such as an amount, a temporal duration, and the like, is meant to encompass variations of ±5% from the specified value.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIG. 1, an electromagnetic device 1 is shown as a motor 10 including a shaft 12, a rotor 14, and a stator 30. The shaft 12, rotor 14, and stator 30 all define a same axial direction. The stator 30 includes a plurality of stator poles 32, each stator pole being wrapped with a conductive coil 72 for inducing an electric current, with the coil occupying a winding envelope 70.

Figure 2:
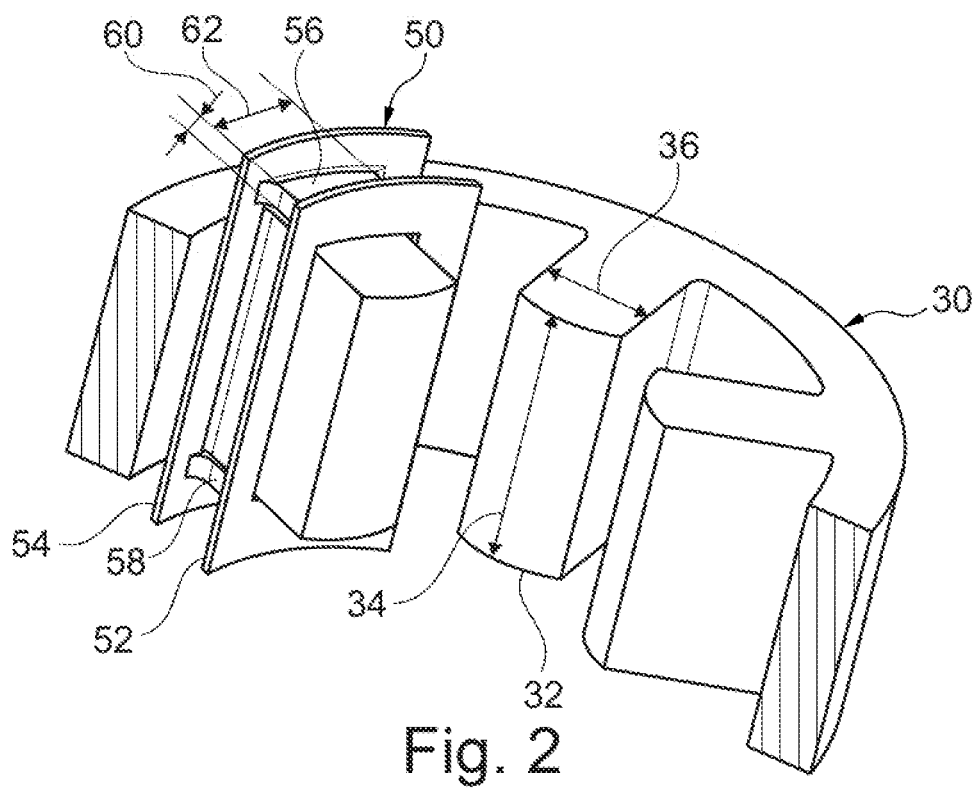
FIG. 2 is a partial cross-sectional perspective view of a stator and bobbin of the electromagnetic device of FIG. 1.
Figure 3:
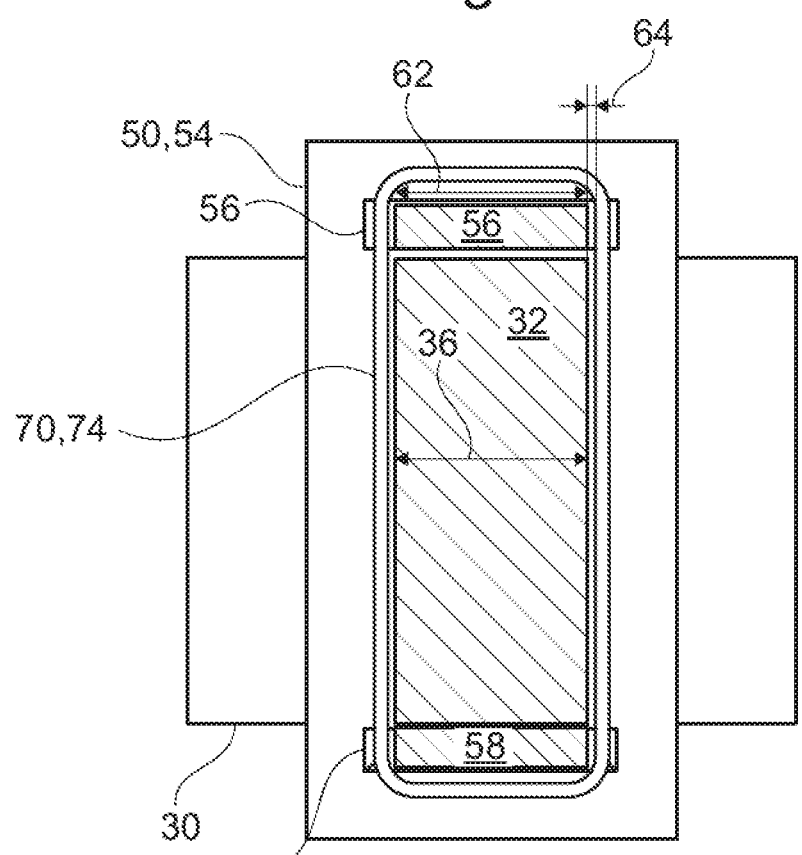
FIG. 3 is a cross-sectional view of a stator pole of the stator of FIG. 2 along with the bobbin and a conductive coil.

As shown in FIGS. 1-3, the stator 30 has a plurality of stator poles 32 extending radially. The stator poles define an axial height 34 and a width 36. In the illustrated embodiment, the stator poles 32 extend radially inwardly from a rim structure toward the shaft 12 and have a substantially rectangular cross-sectional shape.

Turning to FIGS. 2 and 3, a bobbin 50 is shown that defines the winding envelope 70 of coil 72 and spacing the winding envelope from a respective stator pole 32. The bobbin 50 includes a first or inner radial end section 52 opposite a second or outer radial end section 54, and a first wall 56 opposite a second wall 58. The first and second walls 56, 58 may be considered a top bar 56 and a bottom bar 58. The first and second walls 56, 58 each have a thickness 60 and a width 62. The width 62 of the first and second walls

56, 58 is sized to provide a clearance 64, also referred to as an overhang, relative to the stator pole 32.

As shown in FIG. 2, the first and second walls 56, 58 extend between and connect the first and second end sections 52, 54 without any other bobbin structure between and/or connecting the first and second end sections. In particular, there are no sidewalls between the first and end sections. The absence of sidewalls reduces weight and material costs and importantly frees up space for additional windings of coil 72 as further discussed below.

A winding envelope 70 for a conductive coil 72 is defined by each bobbin 50. The winding envelope 70 is adapted to receive a plurality of turns 74, also referred to as winding turns or revolutions, each turn being a single revolution of the coil 72 around the bobbin 50. The magnetic force of the electromagnetic device 1 is linearly proportional to the number of turns 74. It follows that an increase turns 74 (and its attendant increase in the amount of coil 72) results in increased magnetic flux, power density, and torque for the electromagnetic device 1.

It should be noted that preferably multiple layers of the turns 74 of the winding coil 72 are provided; for example seven layers may be provided, each layer having a row of ten turns 74, for a total of seventy turns in one winding envelope 70. In another example shown in FIG. 1, seven turns 74 are provided in a layer.

In an exemplary embodiment of the stator pole 32, the bobbin 50, and the winding envelope 70, a 17% increase in power output is realized via the following arrangement. The stator pole 32 width 36 is 8.4 mm. The first wall 56 and the second wall 58 of the bobbin 58 each have the width 62 as 8.6 mm, resulting in 0.1 mm for clearance 64 on each side of the stator pole 32. The conductive coil 72 is formed from wire having a diameter of 0.44 mm, and is provided as seventy of the turns 74. A corresponding bobbin having sidewalls that are 0.5 mm thick only allows for sixty turns of the coil 72. The bobbin 50 having no sidewalls allows for one more layer of conductive coil 72, the layer being comprised of ten of the turns 74. The ten additional turns 74 result in the 17% power increase and an increase from 600 Amp-turns to 700 Amp-turns. Generally speaking, the clearance 64 may be about 15% to about 35% of the diameter of the wire used for the coil 72 to allow the additional layer of turns 74.

Although there are no sidewalls to the bobbin 50, the conductive coil 72 nonetheless remains spaced from the stator pole 32 due to the overhanging width of the first and second walls 56, 58 of the bobbin 50, along with tension in the conductive coil 72 when wound about the bobbin 50.

The electromagnetic device 1 may be an eccentric pump/motor 10, having the rotor 14 provided as an inner gerotor 16 and an outer gerotor 18, which cooperatively rotate to cause suction/pressure via lobes 20. An eccentric motor 10 is useful in applications where space and cost must be minimized, such as automatic transmission pumps for automobiles with start-stop systems. The bobbin 50 in this application is useful in maximizing power output while minimizing space and protecting the wires of the coil 72 from damage. One skilled in the art should appreciate that the disclosed electromagnetic device 1 and/or the disclosed combination of the bobbin 50 with the winding envelope 70 may be useful in various other applications.

Although the first and second walls 54, 56 of the bobbin 50 are illustrated as axially top and bottom walls, they may instead be positioned along the sides/height of the stator poles 32 to leave open space at the axial top and bottom of the stator poles 32. Such an arrangement may be desirable in applications where motor length must be minimized.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

1. Electromagnetic Device
10. Motor
12. Shaft
14. Rotor
16. Inner Gerotor
18. Outer Gerotor
20. Lobe
30. Stator
32. Stator Pole
34. Height
36. Width
50. Bobbin
52. First Radial End Section
54. Second Radial End Section
56. First Wall
58. Second Wall
60. Thickness
62. Width
64. Clearance
70. Winding Envelope
72. Conductive Coil
74. Turn

What is claimed is:

1. A component for a stator, comprising:
   a bobbin including:
      a first radial end section;
      a second radial end section spaced apart from the first radial end section in a radial direction; and
      a first wall and a second wall extending radially between the first and second radial end sections, the first wall defining a width, wherein the first wall and the second wall are separated in one of an axial direction and a circumferential direction; and
   a coil wrapped around the bobbin, the coil being located in a winding envelope defined by the bobbin, wherein the coil passes from the first wall to the second wall without any portion of the bobbin therebetween.

2. The bobbin of claim 1, wherein the first wall and the second wall are top and bottom walls separated in the axial direction.

3. The bobbin of claim 1, wherein the first wall and the second wall define a gap therebetween.

4. The bobbin of claim 1, wherein the first and second radial end sections both extend axially beyond the first wall and the second wall.

5. The bobbin of claim 4, wherein the first and second radial end sections both extend circumferentially beyond the first wall and the second wall.

6. A stator for an electromagnetic device, comprising:
   a stator pole extending radially;
   a bobbin including:
      a first radial end section,
      a second radial end section spaced apart from the first radial end section in a radial direction, and
      a first wall and a second wall extending radially between the first and second radial end sections, the first and second walls each having a thickness in the axial direction; and
   a winding of conductive coil wrapped around the bobbin, wherein a portion of the winding is spaced from the stator pole by a clearance distance.

7. The stator of claim 6, wherein the first wall and the second wall overhang beyond the stator pole to provide the clearance distance between the winding and the stator pole.

8. The stator of claim 6, wherein the clearance distance that is less than the thickness of the first and second wall.

9. The stator of claim 6, wherein the first wall and the second wall are separated in one of an axial direction and in a circumferential direction.

10. The stator of claim 6, wherein the stator defines an axial direction, and wherein the first and second walls are positioned axially above and below the stator pole.

11. The stator of claim 6, wherein the stator comprises six stator poles, wherein each said stator pole is provided with a respective bobbin.

12. The stator of claim 6, wherein the first and second radial end sections encircle the stator pole.

13. The stator of claim 12, wherein the first and second walls define an inner section of the bobbin, wherein the inner section does not encircle the stator pole.

14. The stator of claim 6, wherein the first wall and the second wall define an axial gap therebetween.

15. The stator of claim 14, wherein the first wall and the second wall have a thickness, and wherein along the axial gap, the winding is spaced from the stator by a distance that is less than the thickness of the first and second walls.

16. The stator of claim 6, wherein the clearance distance is approximately 0.1 mm.

* * * * *